US005957162A

United States Patent [19]

Arai

[11] Patent Number: 5,957,162

[45] Date of Patent: Sep. 28, 1999

[54] PRESSURE ACCUMULATOR SYSTEM

[75] Inventor: Satoshi Arai, Kawasaki, Japan

[73] Assignees: Nippon Pneumatics; Fluidics System Co., Ltd., both of Kanagawa-ken, Japan

[21] Appl. No.: 09/093,297

[22] Filed: Jun. 8, 1998

[51] Int. Cl.[6] .............................. F16L 55/02; F16L 55/04

[52] U.S. Cl. ................................ 138/31; 138/30; 141/19; 220/721

[58] Field of Search ................................ 138/30, 31, 26, 138/178; 141/19; 220/721

[56] References Cited

U.S. PATENT DOCUMENTS

| | | | |
|---|---|---|---|
| 2,557,120 | 6/1951 | Knoblock | 141/19 X |
| 2,702,600 | 2/1955 | Allen | 141/19 X |
| 2,774,381 | 12/1956 | Buri | 131/31 |
| 2,808,080 | 10/1957 | Dino-Biro | 141/19 |
| 2,921,711 | 1/1960 | Mack | 141/19 X |
| 3,834,433 | 9/1974 | Thompson | 141/19 X |
| 4,143,678 | 3/1979 | Sugimura et al. | 138/30 |
| 4,576,159 | 3/1986 | Hahn et al. | 138/31 X |
| 5,388,899 | 2/1995 | Volz et al. | 138/31 X |

*Primary Examiner*—Patrick Brinson
*Attorney, Agent, or Firm*—Steinberg & Raskin, P.C.

[57] ABSTRACT

There is provided a pressure accumulator system comprising a plurality of small-sized gas bombs connected. This dispenses with any large-sized gas bomb that is hard to handle. The pressure accumulator system comprises a plurality of gas bombs each having an ejection port sealed by a membrane member, a membrane-breaking mechanism mounted in the ejection port of each of the gas bombs and operated in accordance with a given electrical signal to force the membrane member of the gas bomb to break, a sequencer for sending an electrical control signal to the membrane-breaking mechanisms to activate them, and a pressure sensor mounted in a conduit communicating the gas bombs and an actuator for producing an output signal to the sequencer. The sequencer is operated according to the output signals from the pressure sensor and, when the pressure inside any one of the gas bombs becomes lower than a present pressure.

6 Claims, 2 Drawing Sheets

PRESSURE ACCUMULATOR SYSTEM

BACKGROUND OF THE INVENTION

1. Field of the Invention

The present invention relates to a pressure accumulator system comprising small-sized gas bombs, or pressure vessels, that are especially easy to handle and combined in such a way that the total capacity of the system is increased with the bombs being used efficiently.

2. Description of the Related Art

With the conventional pressure accumulator, the size of the gas bomb is determined according to various factors such as the capacity of the actuator and the time for which the accumulator is used. For example, where the actuator has a large capacity, a gas bomb having a correspondingly large capacity is used.

Where a large gas bomb having a large capacity must be used, the aforementioned conventional pressure accumulator presents various problems. For instance, where the capacity is increased, it becomes more inconvenient to carry. Furthermore, where a given capacity is exceeded, only legally qualified persons are allowed to handle the accumulator. Hence, limitations are imposed on those who can handle the accumulator. In particular, where a dentist makes a visit to a patient for dental treatment or in a similar situation, a considerably heavy gas bomb must be carried. In the actual situation, making such a visit tends to be avoided simply because it is difficult to carry the gas bomb.

SUMMARY OF THE INVENTION

It is an object of the present invention to provide a pressure accumulator system comprising small-sized gas bombs combined in such a way that the bombs can be used efficiently.

The first invention is characterized in that the pressure accumulator system comprises: a plurality of gas bombs each having an ejection port sealed by a membrane member; a membrane-breaking mechanism mounted in the ejection port of each of the gas bombs, and operated in accordance with a given electrical signal to force the membrane member of the gas bomb to break; a sequencer for sending electrical control signals to the breaking mechanisms to activate them; and a pressure sensor mounted in a conduit communicating the gas bombs and an actuator. The sequencer is operated according to the output signals from the pressure sensor. When the pressure inside any one of the gas bombs becomes lower than a preset pressure, the ejection port of the next gas bomb is opened.

The second invention is characterized in that the membrane-breaking mechanism comprises a cylinder mounted in the ejection port of the gas bombs, a piston mounted in the cylinder, an opening member such as a needle or knife edge mounted on one side of the piston, i.e., on the side facing the ejection port of the gas bomb, a pressure chamber formed to be partitioned by the piston on the side of the piston opposite to the side mounting the opening member, a gas-generating agent provided in the pressure chamber, and a heater for igniting the gas-generating agent, wherein the heaters of the membrane-breaking mechanisms are heated in accordance with an order controlled by the sequencer.

The third invention is characterized in that the membrane-breaking mechanism comprises a solenoid fitted in the ejection port of the gas bomb and having a core, and an opening member such as a needle or knife edge mounted on the core of the solenoid, wherein the solenoid is energized in accordance with an order controlled by the sequencer.

The fourth invention is characterized in that a buffer tank is provided in a conduit communicating the gas bombs and the actuator, a pressure-adjusting valve is mounted between the gas bombs and the buffer tank, and the pressure sensor is mounted in the buffer tank.

Other objects and features of the invention will appear in the course of the description thereof, which follows.

DETAILED DESCRIPTION OF THE INVENTION

Figure 1:
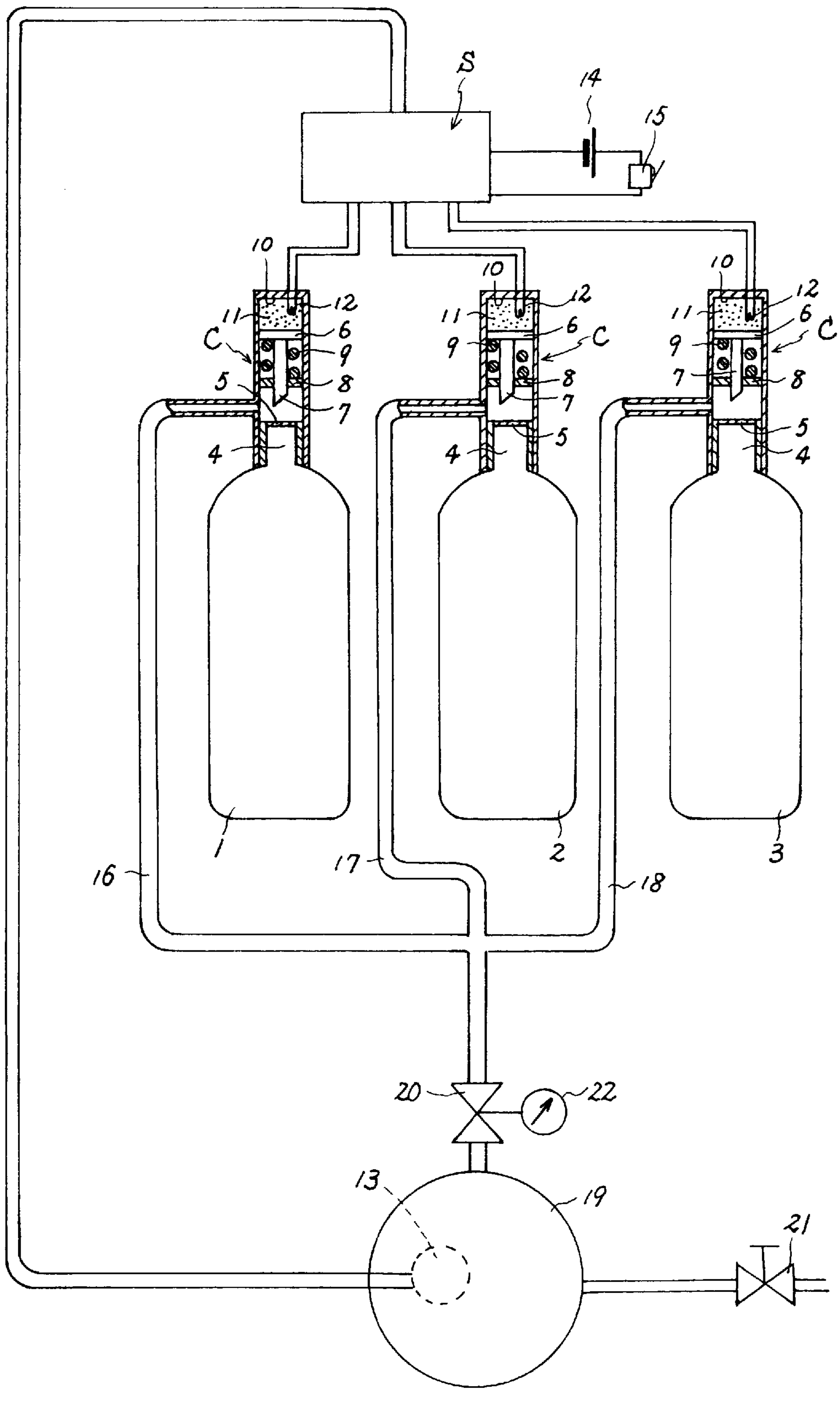
FIG. 1 is a circuit diagram of a pressure accumulator system according to the first embodiment of the present invention.
Figure 2:
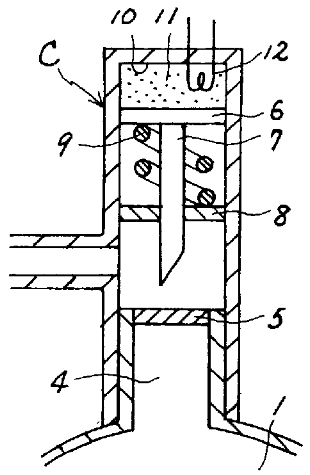
FIG. 2 is a cross-sectional view of a membrane-breaking mechanism of the first embodiment which is in its normal state.
Figure 3:
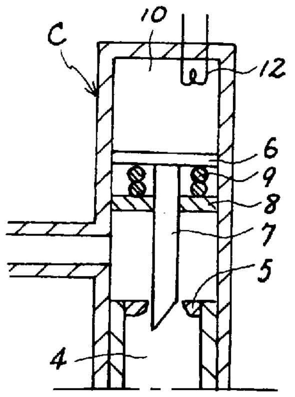
FIG. 3 is a cross-sectional view of the membrane-breaking mechanism of the first embodiment which is in operation.

Referring to FIGS. 1–3, there is shown a pressure accumulator system according to the first embodiment of the present invention. This system is equipped with small-sized gas bombs 1–3 that are all identical in structure as well as in accessories. Therefore, of these bombs 1–3, only the gas bomb 1 will be described with accessories of the gas bombs 2 and 3 being designated by the same reference numerals as those for the accessories of the gas bomb 1.

The gas bomb 1 has an ejection port 4 sealed by a membrane member 5. A cylinder C is fitted in the ejection port 4.

A piston 6 is slidably mounted in the cylinder C. An opening member 7 consisting of a needle or a knife edge is mounted at one side of the piston 6 facing the ejection port 4.

A spring support 8 is mounted almost midway between the piston 6 and the ejection port 4. A spring 9 is mounted between the spring support 8 and the piston 6. Therefore, the piston 6 is usually maintained in the illustrated normal position by the action of the spring 9. In this normal position of the piston 6, the opening member 7 is maintained at a distance from the ejection port 4. When the piston 6 moves into abutment with the spring support 8 against the action of the spring 9, the opening member 7 penetrates into the membrane member 5, breaking it, as shown in FIG. 3.

A pressure chamber 10 is formed on the opposite side of the opening member 7 inside the cylinder C described above. A gas-generating agent 11 made of sodium nitride, black powder, or an azide is contained in the pressure chamber 10. A heater 12 consisting of Nichrome wire is mounted in this pressure chamber 10. Accordingly, when the heater 12 is heated, the gas-generating agent 11 explodes to increase the pressure inside the pressure chamber 10. With this pressure increase, the piston 6 moves against the force of the spring 9, piercing the membrane member 5 in the ejection port 4. Consequently, pressurized gas is ejected from this ejection port 4 of the gas bomb. The cylinder C, the piston 6, the opening member 7, the pressure chamber 10, the gas-generating agent 11, and the heater 12 together form a membrane-breaking mechanism according to the present invention.

The aforementioned heater 12 is connected with a sequencer S consisting of a sequential circuit, and acts to open the ejection ports 4 of the gas bombs 1–3 in turn in response to the signal from a pressure sensor 13 (described later). A dry battery 14 and a manual switch 15 are connected with the sequencer S.

The gas bombs 1–3 are connected to a buffer tank 19 in parallel with each other via pipes 16–18. A pressure-adjusting valve 20 is mounted also in the conduit going to the buffer tank 19 to adjust the pressure inside the tank 19. A valve 21 is mounted also in the conduit communicating the buffer tank 19 and an actuator (not shown). A pressure gauge 22 is attached to the pressure-adjusting valve 20.

The pressure sensor 13 is mounted inside the buffer tank 19 as mentioned previously. When the pressure inside the tank 19 becomes lower than a preset pressure, the pressure sensor 13 produces a pressure signal to the sequencer S.

The first embodiment of the pressure accumulator system as described above operates in the manner described below. When the manual switch 15 is closed, the membrane-breaking mechanism fitted to the first gas bomb 1 is set into operation. That is, the heater 12 in the pressure chamber 10 is heated, causing the gas-generating agent 11 to explode. The exploding force moves the piston 6 against the force of the spring 9 to break the membrane member 5 in the ejection port 4 by the opening member 7.

This ejects compressed gas from the gas bomb 1. The gas passes through the pipe 16, the pressure-adjusting valve 20, the buffer tank 19, and the valve 21 in this order, and is supplied into the actuator (not shown). At this time, the pressure of the supplied gas can be adjusted at will with the pressure-adjusting valve 20. Since the supplied gas with the adjusted pressure is once stored in the buffer tank 19, the pressure of the gas supplied into the actuator can be maintained constant.

When the pressure inside the buffer tank 19 becomes lower than a preset pressure, the pressure sensor 13 detects it and sends a pressure signal to the sequencer S, informing it that the first gas bomb 1 is being exhausted.

On receiving this pressure signal, the sequencer S operates to open the ejection port of the second gas bomb 2. The operation of the membrane-breaking mechanism and the configuration of the pressure gas supply system are the same as those for the first gas bomb 1.

In the system of the first embodiment as described above, a number of small-sized gas bombs can be connected. Therefore, even if the capacity of the actuator is large, it is not necessary to use a large-sized gas bomb. In this way, each of the gas bombs can be made small. Hence, the person who handles this system is not required to have any special qualification. Furthermore, it is more convenient to carry a plurality of small gas bombs than to carry one large bomb. For example, a small gas bomb can be held in a bag or the like.

Figure 4:
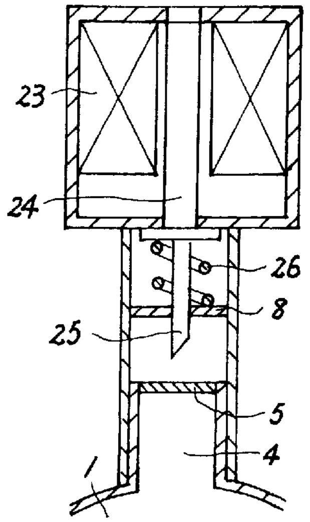
FIG. 4 is a cross-sectional view of a membrane-breaking mechanism of the pressure accumulator system according to the second embodiment of the present invention, which mechanism is in its normal state.

Referring to FIG. 4, there is shown the second embodiment of the pressure accumulator system according to the present invention. In the second embodiment, a solenoid 23 having a core 24 is used as the membrane-breaking mechanism. An opening member 25 similar to that in the first embodiment is mounted on the core 24 of the solenoid 23. The force of a spring 26 acts on this core 24.

The solenoid 23 is connected with the sequencer S and energized in response to the output signal from the sequencer S as described above. Except for the above described composition, the second embodiment is the same as the first embodiment.

Accordingly, when a signal from the sequencer S is applied, the solenoid 23 is excited to move the core 24 against the force of the spring 26. This causes the opening member 25 to break the membrane member 5 in the ejection port 4.

According to the first invention, a number of small-sized gas bombs can be used in being connected, so that the total capacity can be increased by the amount of being connected. Furthermore, whatever large is the total capacity, the person who handles the pressure accumulator system is not required to have any legal qualification as long as the capacity of each gas bomb is kept below the capacity for which the legal regulation is required.

Even if the number of the small-sized gas bombs is considerably large, they can be carried in bags or the like. Therefore, they are easier to carry than the case where a large gas bomb is carried on a person's back. Moreover, the gas bombs can be used in turn. In consequence, the pressure accumulator system can be used more efficiently than the case where all gas bombs are opened simultaneously.

According to the second invention, the membrane-breaking mechanism uses a gas-generating agent, so that the whole pressure accumulator system can be miniaturized.

According to the third invention, the membrane-breaking mechanism employs a solenoid, by which electrical control provided by the sequencer is made accurate. In addition, the membrane-breaking mechanism can be used repeatedly.

According to the fourth invention, a buffer tank if mounted, and a pressure sensor is installed in the tank. Therefore, a stable pressure is detected by the pressure sensor. If the output signal from the pressure sensor is stable, the stable control is achieved accordingly.

What is claimed is:

1. A pressure accumulator system comprising:

a plurality of gas bombs each having an ejection port sealed by a membrane member;

a membrane-breaking mechanism mounted in said ejection port of each of said gas bombs, and operated in accordance with a given electrical signal to force said membrane member of said gas bombs to break;

a sequencer for sending an electrical control signal to said membrane-breaking mechanisms to activate them; and a pressure sensor mounted in a conduit communicating said gas bombs and an actuator for producing an output signal to said sequencer, said sequencer being operated according to said output signal from said pressure sensor and, when the pressure inside any one of said gas bombs becomes lower than a preset pressure, said sequencer operates to open the ejection port of the next gas bomb.

2. The pressure accumulator system of claim 1, wherein said membrane-breaking mechanism comprises a cylinder mounted in the ejection port of said gas bombs, a piston mounted in said cylinder, an opening member consisting of a needle, knife edge, or the like mounted on one side of said piston facing the ejection port of the gas bomb, a pressure chamber formed to be partitioned by said piston on the side of said piston opposite to the side mounting said opening member, a gas-generating agent provided in said pressure chamber, and a heater for igniting said gas-generating agent, said heater being heated in accordance with an order controlled by said sequencer.

3. The pressure accumulator system of claim 1, wherein said membrane-breaking mechanism comprises a solenoid fitted in the ejection port of said gas bomb and having a core, and an opening member consisting of a needle, knife edge, or the like mounted on said core of said solenoid so as to face the ejection port of said gas bombs, said solenoid being energized in accordance with an order controlled by said sequencer.

4. The pressure accumulator system of claim 1, wherein a buffer tank is provided in a conduit communicating said gas bombs and said actuator, a pressure-adjusting valve is mounted between said gas bombs and said buffer tank, and a pressure sensor is mounted in said buffer tank.

5. The pressure accumulator system of claim 2, wherein a buffer tank is provided in a conduit communicating said gas bombs and said actuator, a pressure-adjusting valve is mounted between said gas bombs and said buffer tank, and a pressure sensor is mounted in said buffer tank.

6. The pressure accumulator system of claim 3, wherein a buffer tank is provided in a conduit communicating said gas bombs and said actuator, a pressure-adjusting valve is mounted between said gas bombs and said buffer tank, and a pressure sensor is mounted in said buffer tank.

* * * * *